(12) United States Patent
Paul (10) Patent No.: US 8,391,281 B2
(45) Date of Patent: Mar. 5, 2013

(54) ROUTER DESIGN FOR 3D NETWORK-ON-CHIP

(75) Inventor: Bipul C. Paul, Santa Clara, CA (US)

(73) Assignee: Toshiba America Research, Inc., San Jose, CA (US)

( * ) Notice: Subject to any disclaimer, the term of this patent is extended or adjusted under 35 U.S.C. 154(b) by 369 days.

(21) Appl. No.: 12/751,811

(22) Filed: Mar. 31, 2010

(65) Prior Publication Data

US 2011/0243147 A1    Oct. 6, 2011

(51) Int. Cl.
    *H04L 12/50* (2006.01)
(52) U.S. Cl. .................. 370/359; 370/413; 370/463
(58) Field of Classification Search .............. None
    See application file for complete search history.

(56) References Cited

U.S. PATENT DOCUMENTS

| | | | |
|---|---|---|---|
| 7,518,408 B2 * | 4/2009 | Locatelli et al. | 326/93 |
| 7,739,460 B1 * | 6/2010 | Carr | 711/155 |
| 7,792,030 B2 * | 9/2010 | Mangano et al. | 370/230.1 |
| 7,826,460 B2 * | 11/2010 | Lee | 370/395.62 |
| 7,957,381 B2 * | 6/2011 | Clermidy et al. | 370/392 |
| 8,040,799 B2 * | 10/2011 | Hoover et al. | 370/230 |
| 8,291,201 B2 * | 10/2012 | Schwinn et al. | 712/229 |
| 2008/0205432 A1 * | 8/2008 | Gangwal | 370/458 |
| 2008/0294803 A1 * | 11/2008 | Mangano et al. | 710/15 |
| 2009/0147783 A1 * | 6/2009 | Maruccia et al. | 370/389 |
| 2009/0292907 A1 * | 11/2009 | Schwinn et al. | 712/229 |
| 2010/0115483 A1 * | 5/2010 | Lepape et al. | 716/10 |
| 2010/0211720 A1 * | 8/2010 | Satpathy et al. | 710/317 |
| 2011/0064087 A1 * | 3/2011 | Lan et al. | 370/401 |

OTHER PUBLICATIONS

Edith Beigne et al. "An Asynchronous Power Aware and Adaptive NOC Based Circuit" IEEE Journal of Solid-State Circuits, Apr. 2009, pp. 1167-1177, vol. 44, No. 4.

Ge-Ming Chiu "The Odd-Even Turn Model for Adaptive Routing," IEEE Transactions on Parallel and Distributed Systems, Jul. 2000, pp. 729-738, vol. 11, No. 7.

Jingcao Hu et al. "DyAD—Smart Routing for Networks-on-Chip" Proceeding of Design Automation Conference (DAC), 2004, pp. 260-263.

Vassos Soteriou et al. "A High-Throughput Distributed Shared-Buffer NoC Router" IEEE Computer Architecture Letters, 2009, pp. 21-24, vol. 8, No. 1.

* cited by examiner

*Primary Examiner* — Michael J Moore, Jr.
(74) *Attorney, Agent, or Firm* — Westerman, Hattori, Daniels & Adrian, LLP (57) ABSTRACT

A network-on-chip router which includes an input buffer, an input controller connected to said input buffer, an arbiter connected to said input controller, a crossbar connected to said arbiter and said input buffer, and an output buffer connected to said crossbar. The network-on-chip router minimizes propagation time of data through the router by ensuring that the propagation delay of data through an input buffer is less than the combined propagation delay of data through an input controller and arbiter.

19 Claims, 12 Drawing Sheets

FIG. 8(A) Transmission gate
FIG. 8(B) Pass transistor

ROUTER DESIGN FOR 3D NETWORK-ON-CHIP

FIELD OF THE INVENTION

The present invention relates, e.g., to high performance multi-core processors, and in preferred embodiments, asynchronous network-on-chip routers.

BACKGROUND

Routing design specific global on chip wires for system-on-chip (SOCs) can be costly and inefficient. Instead, on-chip routers have been developed to route packets. Network-on-chip (NOC) routers route packets of data to and from desired locations on an integrated circuit. The performance of NOC routers depends on the communication infrastructure built into the chip. Latency and throughput define the performance of an NOC router, and high performance NOC routers look to achieve low power consumption, high data rates, and minimal area usage.

Various router designs including both synchronous and asynchronous designs have been explored for network-on-chip (NOC) applications. Routing algorithms such as wormhole, virtual channel, etc., have also been extensively studied. While asynchronous routers are expected to perform better than synchronous routers in NOC applications, the design of asynchronous routers is far more complicated than the design of synchronous routers.

One the other hand, a wormhole routing algorithm, where a chain of data (also called flits) propagates through the network like a worm when a path is available, is easy to implement compared to a virtual channel router, but is less efficient than the latter under congestion conditions, and consequently reduces throughput.

In virtual channel routing, during congestion, the entire data chain (packet) needs to be stored inside a router to clear the channel for other incoming packets and hence, virtual channel routing is complicated to design and requires larger storage space. This additional storage space can increase power consumption and require more area on the chip. Further, various lengths and types of buffer implementations have been explored to store data inside a router. However, to maximize the network performance in terms of latency and throughput, these techniques need to be optimized through better designs and implementations.

SUMMARY

The preferred embodiments of the present invention improve upon the foregoing and other background technologies. In this disclosure, a full custom design of an asynchronous router suitable for 3 dimensional (3D) NOC topologies is explained. The 3D NOC router uses an optimized cascaded input buffer of optimal length instead of a typical FIFO (First-In-First-Out), in order to maximize performance while keeping the design simple. It also uses a pass transistor or transmission gate based crossbar to minimize the crossbar delay. This also consumes less area on the chip and less power. Although this design is suitable for a 3D NOC, it is applicable to any two dimensional (2D) NOC structure as well.

An advantage of the present 3D NOC router is low power consumption, reduced area on the chip, and low latency (due to asynchronous and full custom design). Further, no synchronization issues arise as the 3D NOC router uses an asynchronous design.

The asynchronous, 3D NOC router has been developed with a wormhole routing algorithm. The router uses cascaded latches for an input buffer to achieve a compact and low power design, while maintaining the maximum length of the buffer so that the data propagation delay is less than the combined delay of the input controller and the arbiter. This ensures that the input buffer delay does not affect the overall router delay.

The NOC router also uses a single stage output buffer, which besides providing extra storage, helps restore the full swing of data from the crossbar and provides signal boost to the output channel. Further, the NOC router uses a transmission or pass gate based crossbar switch for fast, compact and low-power router operation. Also, a logic gate based implementation of an adaptive routing algorithm realizes a fast, low power consumption and reduced area router.

According to an embodiment of the invention, a network-on-chip router includes an input buffer, an input controller connected to the input buffer, an arbiter connected to said input controller, a crossbar connected to the arbiter and said input buffer, and an output buffer connected to the crossbar.

According to another aspect of the invention, the propagation delay of data through the input buffer is lower than a combined propagation delay of data through the input controller and the arbiter.

According to another aspect of the invention, the input buffer comprises a first data latch and a second data latch arranged in series so that an output of the first data latch is an input of the second data latch.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and other features and advantages of embodiments of the present invention will become more apparent by describing in detail exemplary embodiments thereof with reference to the attached drawings in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
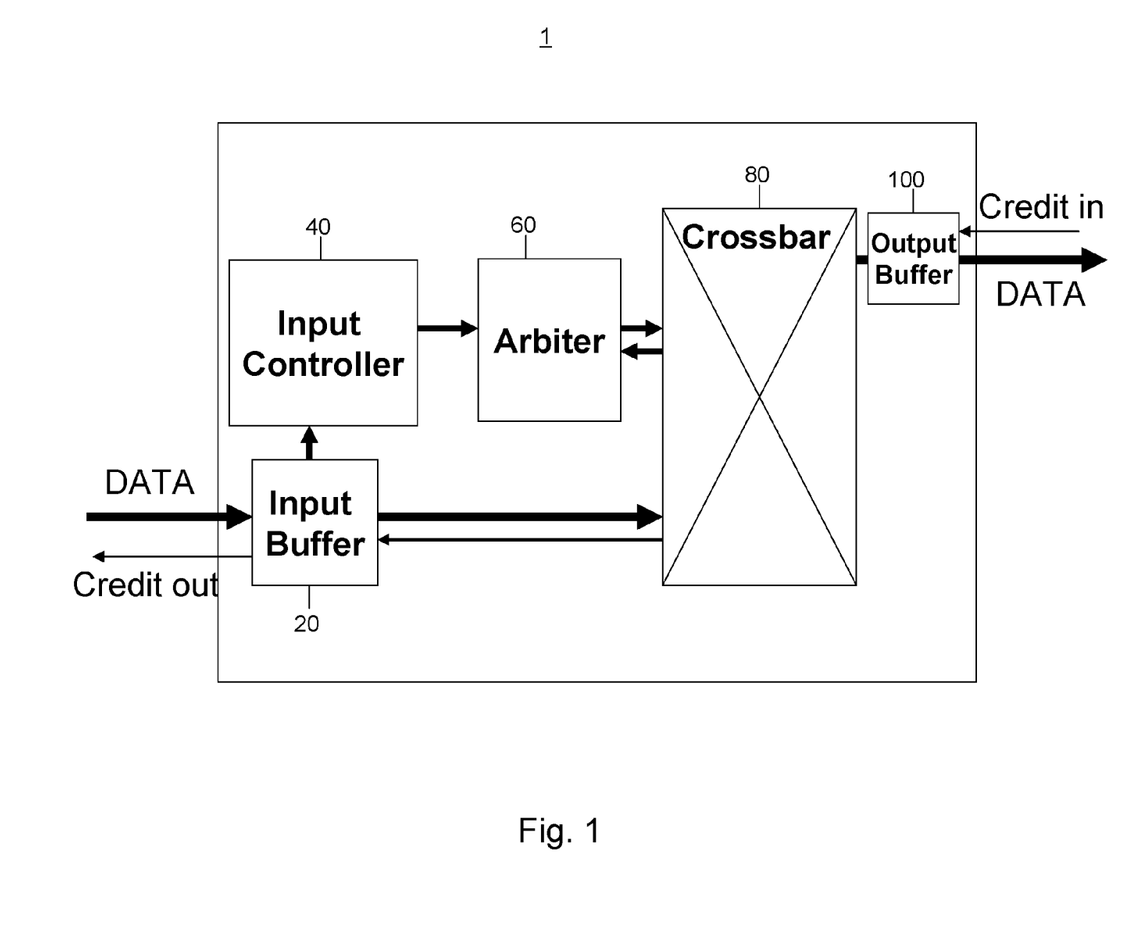
FIG. 1 is a schematic diagram of data flow from an input to an output of the NOC router.

FIG. 1 shows a schematic diagram of data flow from an input of the NOC router 1 to the output of the NOC router 1, based on an adaptive wormhole routing algorithm. The NOC router 1 includes an input buffer 20, an input controller 40, an arbiter 60, a crossbar switch 80 and an output buffer 100. In the multi-port router 1, each input port has a separate input buffer and a separate input controller and each output port has separate output buffer. NOC router 1 uses both input and output buffers.

Input buffer 20 is used to temporarily store incoming data to NOC router 1 to prevent any interruption in data transmission due to congestion at the output port. Conversely, output buffer 100 provides extra storage and helps restore the full swing of data from crossbar 80 and provides signal boost to the output channel.

The input controller 40 selects the appropriate output port based on the destination address of the data. Once the appropriate output port is determined by the input controller 40, arbiter 60 assigns the data to a particular output port. The corresponding crossbar 80 switches are then enabled for data transmission to the next router/destination.

Figure 2A:
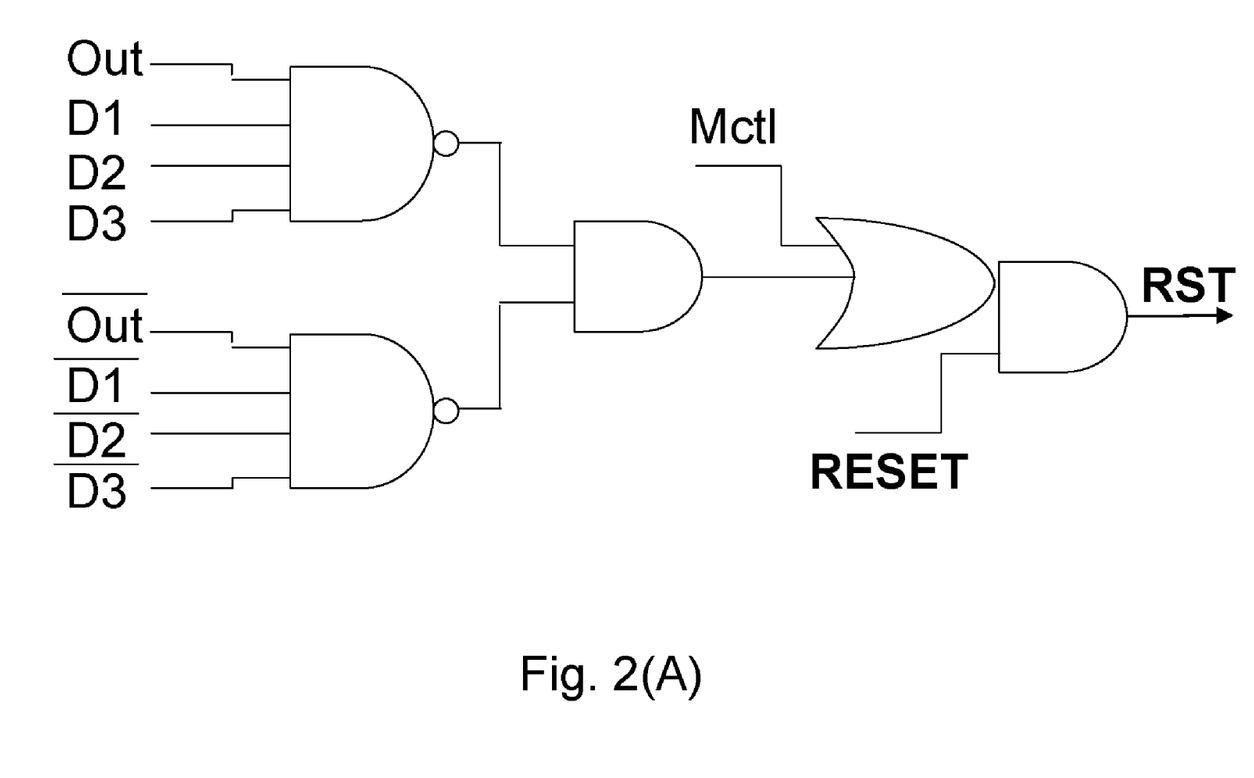
FIG. 2(A) is a circuit diagram of an initialization circuit for the input buffer controller.

FIG. 2(A) shows a design of the input buffer controller 40. The control signal 'Mct1,' generated by the source (processing element) or propagated from a previous output port, is responsible for data propagation through the router. The 'RST' signal is generated to reset all latches before a new communication is started. The 'RESET' pulse is only used during power-up to initialize all latch outputs to zero before the network operation. When 'Mct1' goes high, a new communication starts and data starts flowing through the cascaded latches asynchronously, as shown in FIG. 3.

Figure 2B:
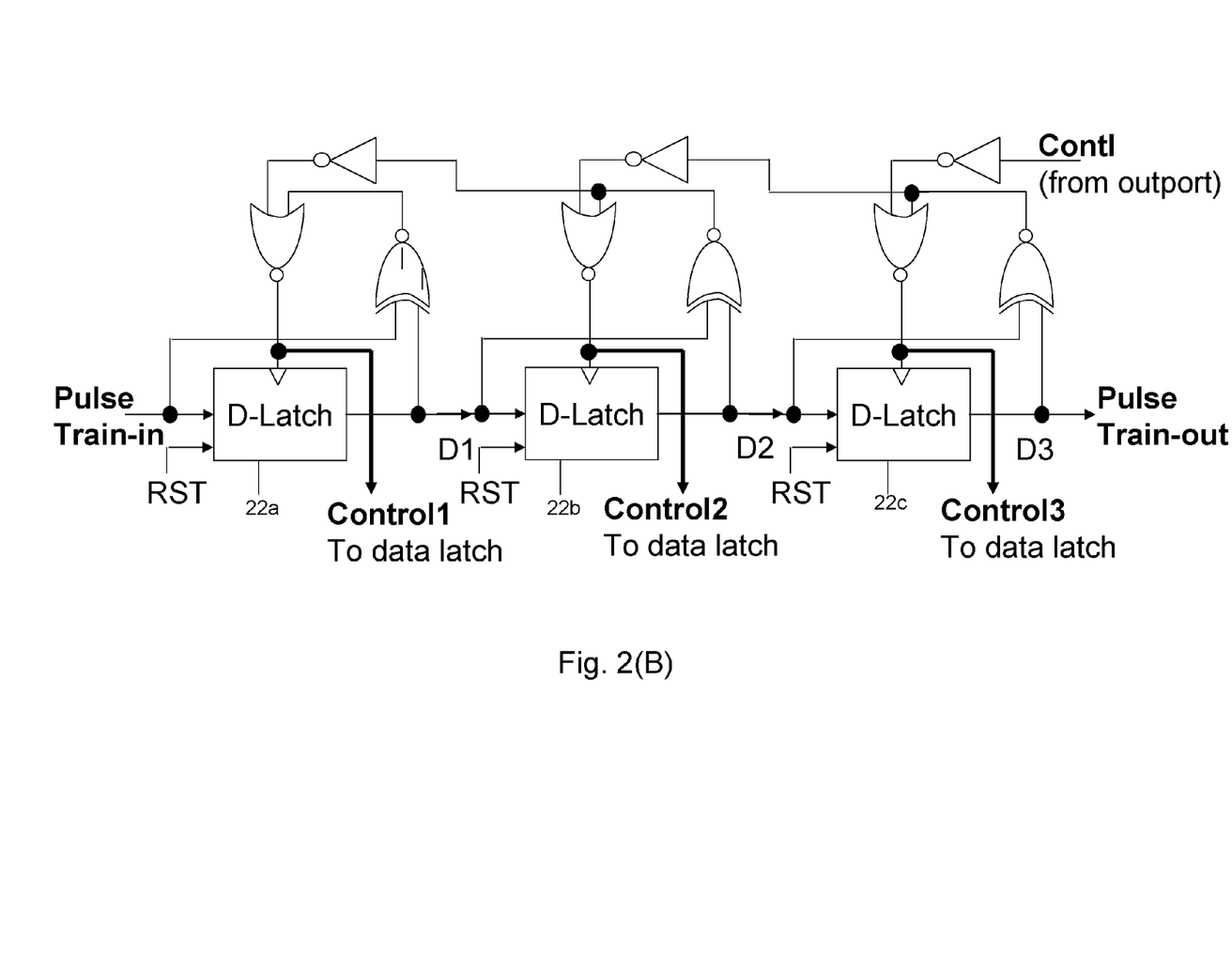
FIG. 2(B) is a circuit diagram of an input buffer controller of the NOC router.
Figure 3:
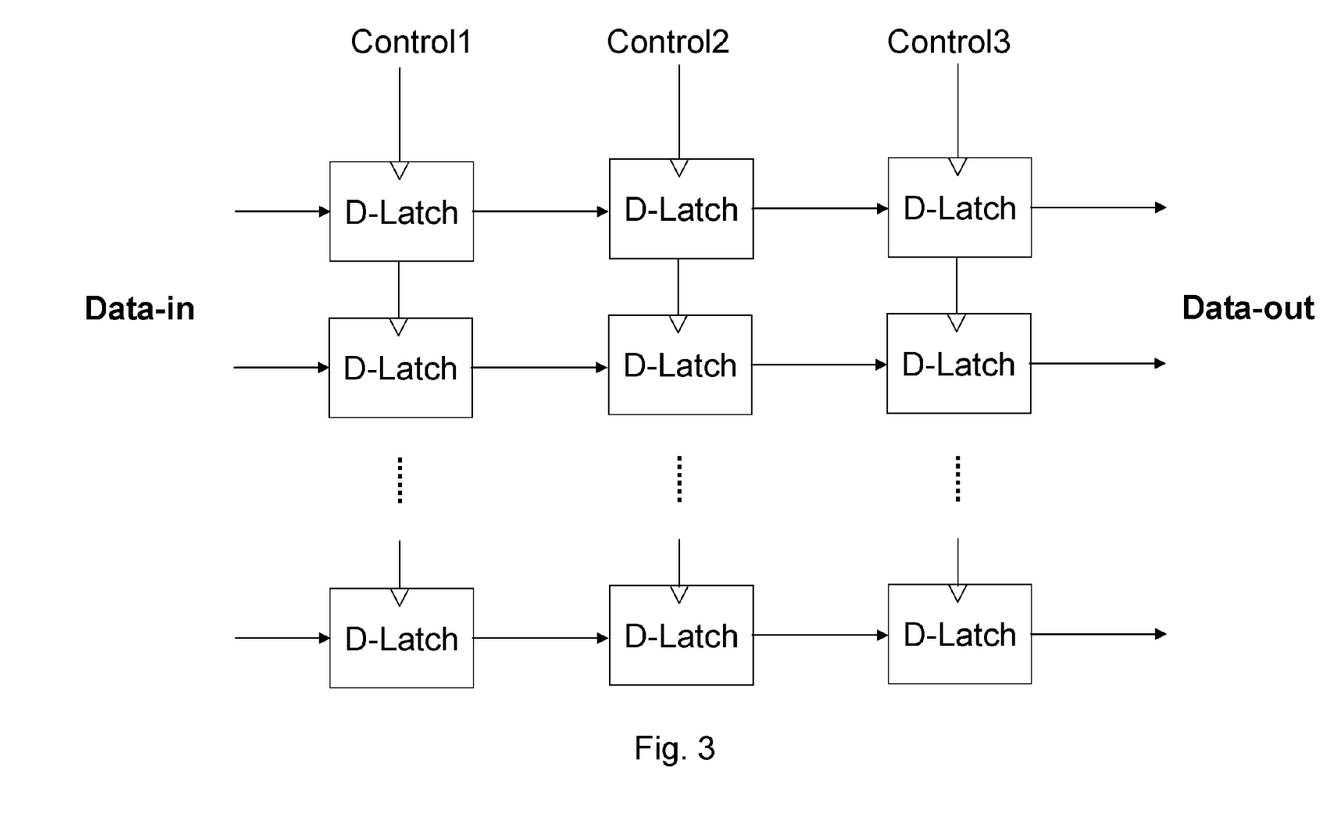
FIG. 3 is a schematic diagram of cascaded data latches for an input buffer in the NOC router.

A pulse train is generated at the source which propagates through the cascaded latches shown in FIG. 2(B) and generates control signals 'Control1,' 'Control2,' and 'Control3,' which act as clocks for the data latches 22a, 22b and 22c, shown in FIG. 3. The signal 'Cont1' controls the data flow to the output port based on the status of the output buffer 100. When 'Cont1' is high, the D-latch (e.g. 22c) is enabled if the data at the latch input is not equal to its output. The latch then generates a control pulse, e.g. 'Control3'. This control pulse then propagates the data in the data latch (FIG. 3). Subsequently, data from previous latches also propagate through the input buffer.

The number of cascaded latches can be varied according to the network design, and the maximum number is chosen so that the data propagation delay is less than the combined delay of the input controller 40 and the arbiter 60. Thus, if the delay from the input controller 40 is $x_1$ and the delay from the arbiter 60 is $x_2$, and the delay from the cascaded data latches is $x_3$, then $x_3$ is $<(x_1+x_2)$.

Having the delay from the data latches lower than the delay of the input controller and arbiter ensures that the input buffer delay does not affect the router latency, while keeping the design simple, resulting in less area and lower power consumption compared to a FIFO (first-in-first-out) queue design.

Figure 4:
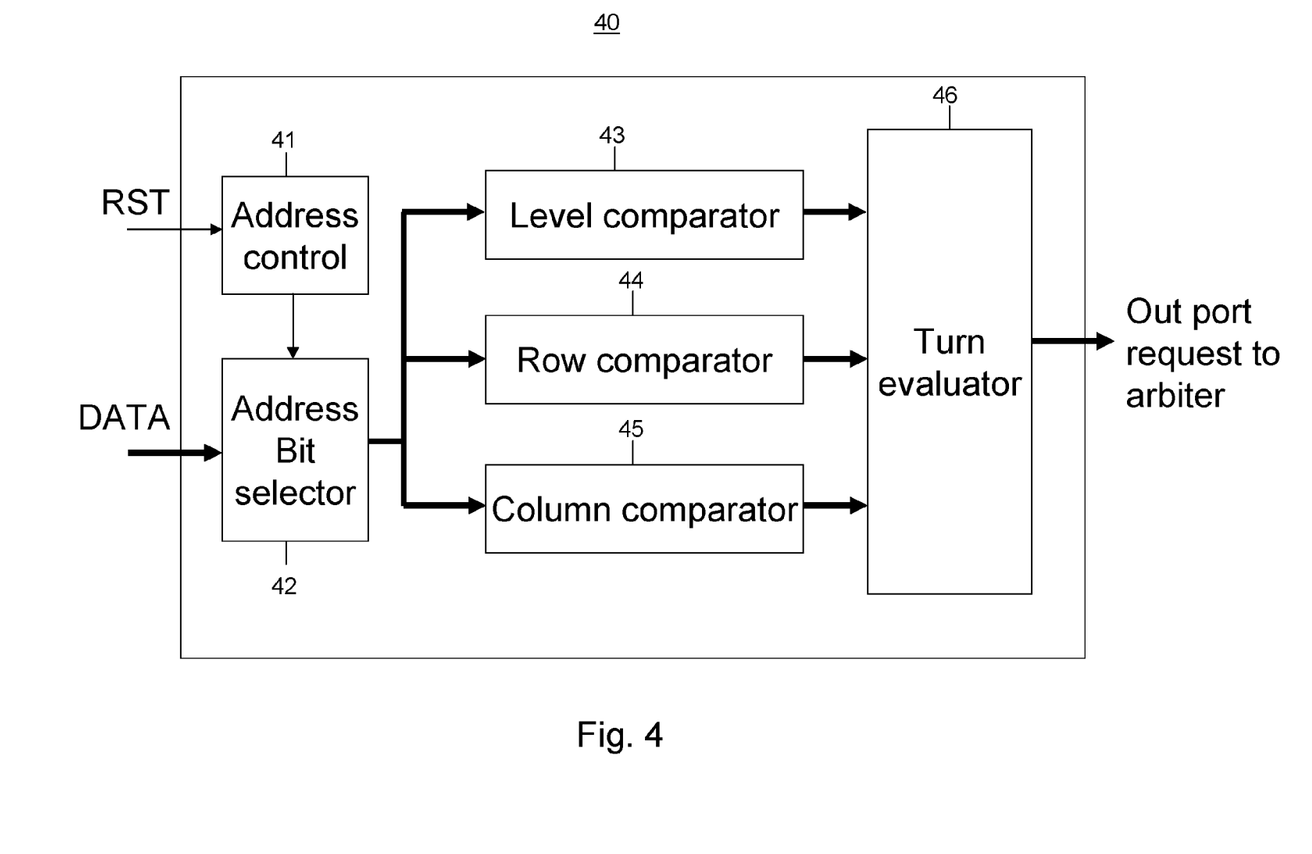
FIG. 4 is a schematic of an input controller of the NOC router.

FIG. 4 shows the schematic block diagram of the input controller 40 in the asynchronous NOC router 1. It includes address control logic 41, address bit selector 42, level comparator 43, row comparator 44, column comparator 45, and a turn evaluator 46.

The present embodiment uses an adaptive shortest path algorithm in order to route the packets, discussed in detail below. The level comparator 43 determines if the packets need to go to an adjacent level, or stay on the same level. The row comparator 44 determines if the packets need to go to an adjacent row, or stay in the same row. The column comparator 45 determines if the packets need to go to an adjacent column, or stay in the same column.

The turn evaluator 46 then determines the appropriate turn the packets should take, based on the level, row and column comparators.

Figure 5:
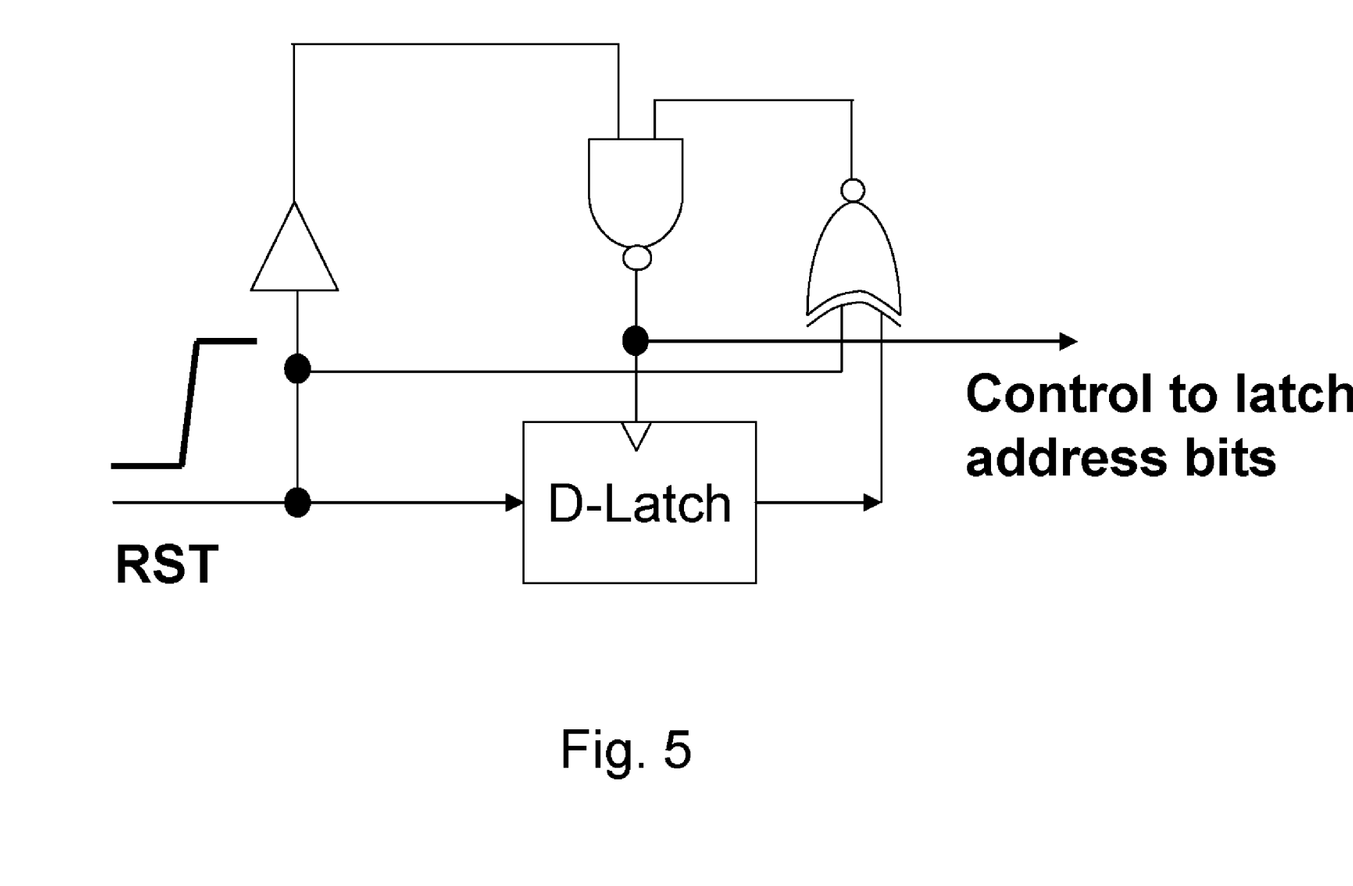
FIG. 5 is an address control circuit of the input controller of the NOC router.
Figure 6:
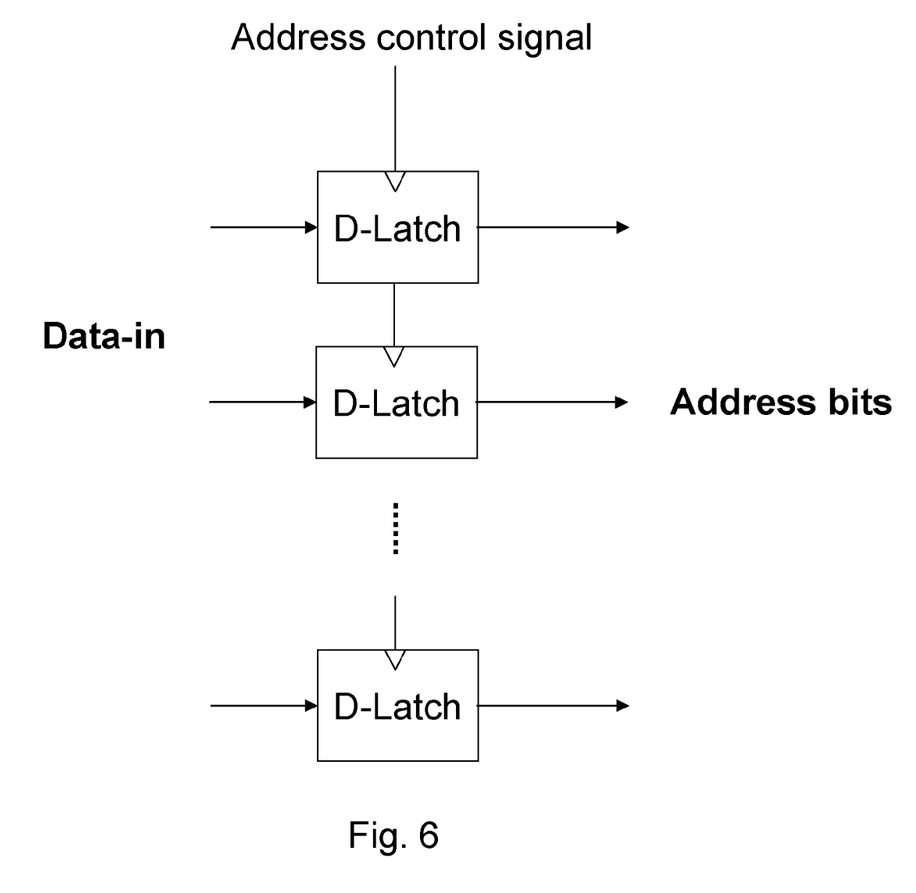
FIG. 6 is a selection circuit of the input controller of the NOC circuit.

The address control circuit is shown in FIG. 5, which generates a control signal to latch address bits (shown in FIG. 6) from the first set of data (flits) of a packet when 'RST' (generated as shown in FIG. 2(A)) goes to high. The latched address bits are then compared with the coordinate of the local router and appropriate output ports are selected adaptively. The comparator circuits 43, 44 and 45 are logic based, unlike conventional look-up table based designs. Further, an 'odd-even' turn control circuit can be used to prevent any deadlock situation in the network.

One advantage of the input controller design in the present embodiment is that it uses shortest path adaptive routing, which does not need any congestion information from neighboring routers. Thus, the route that a packet will take will be a shortest possible route.

Based on the allowed turn evaluation, the input controller 40 then sends the output port requests to the arbiter 60. The arbiter 60 then grants one of the available output ports based on the request, or if none of the requested ports is available, (i.e., presently used by other input ports) then the requests are stored in a FIFO. Once one of the requested output ports is available, a control signal is generated for corresponding crossbar switches to establish a channel between the input and output ports.

Figure 7:
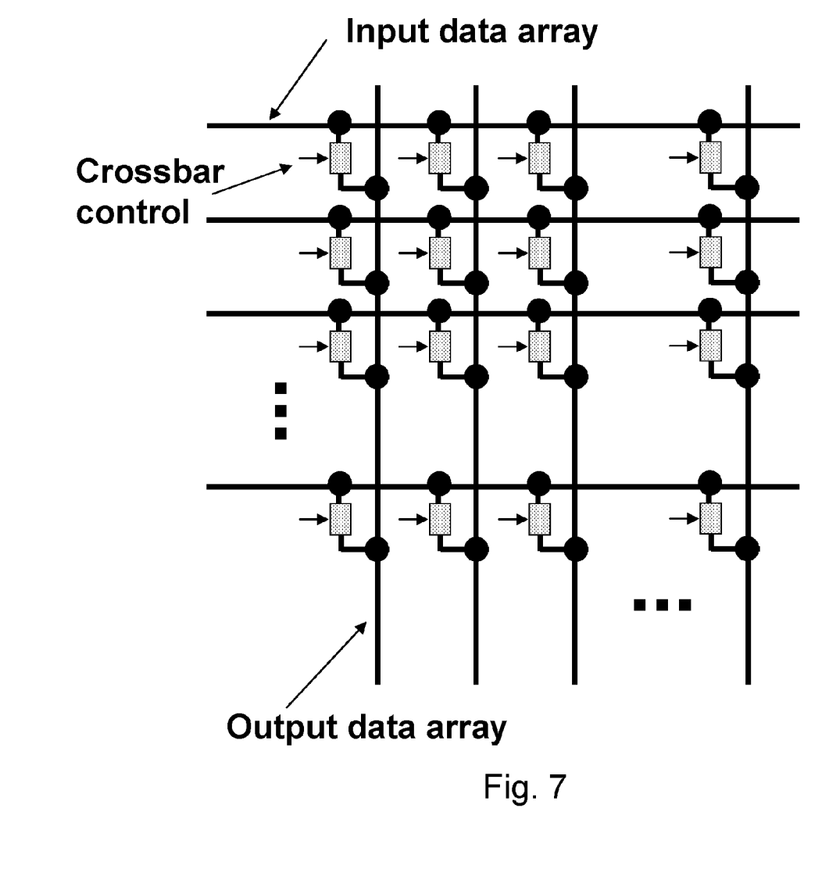
FIG. 7 is a schematic diagram of a crossbar switch array in the NOC router.
Figure 8A:
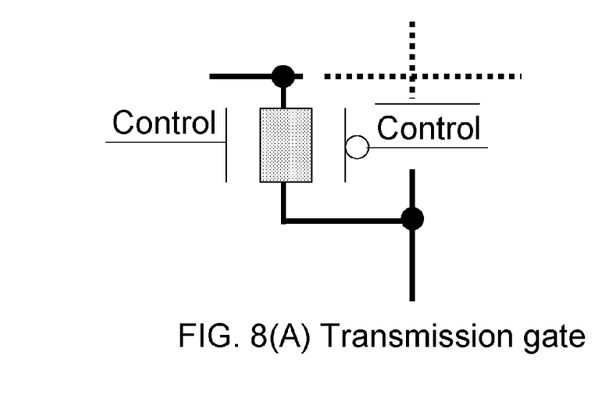
FIG. 8(A) is a crossbar switch using a transmission gate.
Figure 8B:
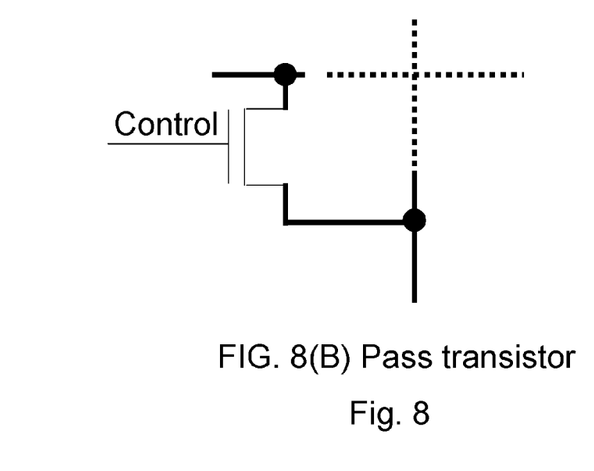
FIG. 8(B) is a crossbar switch using a pass transistor.

FIG. 7 shows a schematic of the proposed crossbar switch array which uses transmission or pass gates (FIG. 8). Unlike tri-gate or multiplexer based crossbar arrays conventionally used in a NOC router, the present embodiment, using transmission gates or pass transistors, is designed to be fast, compact (low area) and consume less power than a conventional router.

Figure 9:
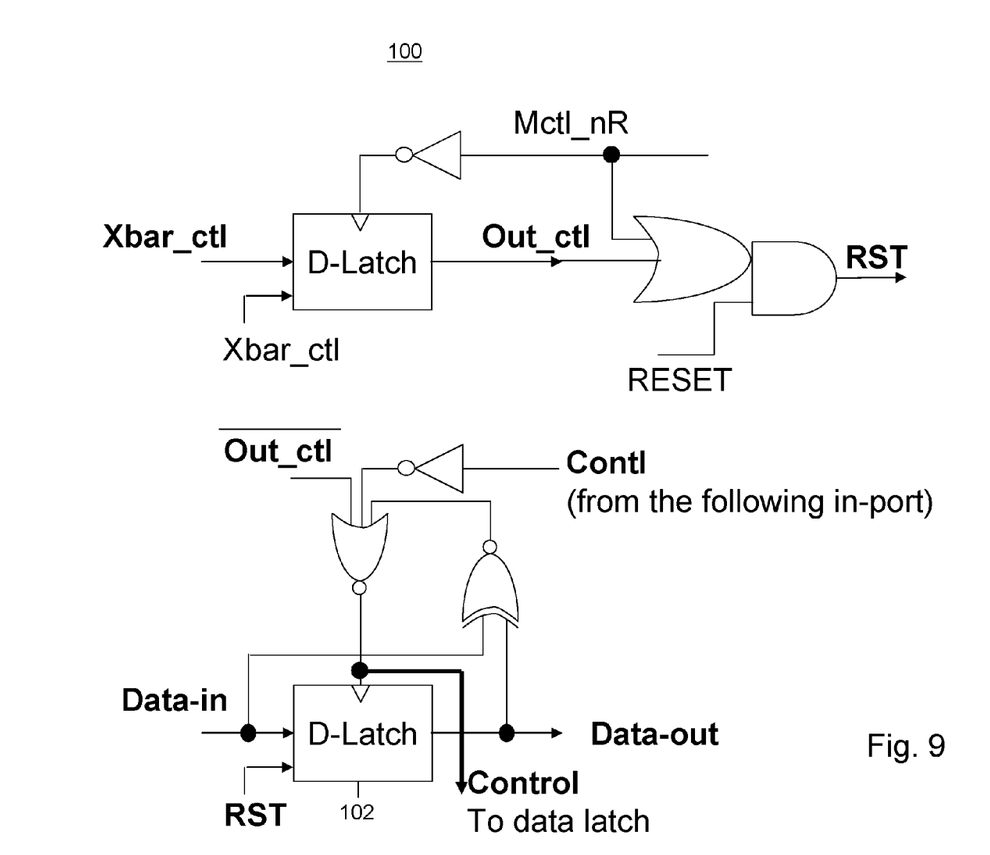
FIG. 9 is a circuit diagram of an output buffer control circuit of the NOC router.

FIG. 9 shows the control circuit of an output port of the NOC router 1. The signal 'Mct1_nR' controls if the following router's input port is ready for data communication. Based on the crossbar control signal, 'Xbar_ct1' and 'Mct1_nR,' the reset signal 'RST' is generated to initialize the communication. The 'Cont1' signal provides the present data status in the input buffer of the following router and controls the data flow in the channel in an asynchronous fashion. Once the input to the output channel is established by the crossbar link, the pulse train from the input buffer 20 controls the data flow to the output of the NOC router 1 and generates the control signal 'Control' for data flowing through the output latch 102 shown in FIG. 10. The output buffer 100 restores the full swing of data from crossbar 80 and provides a signal boost to the output channel, in addition to providing storage for the data under congestion.

Figure 10:
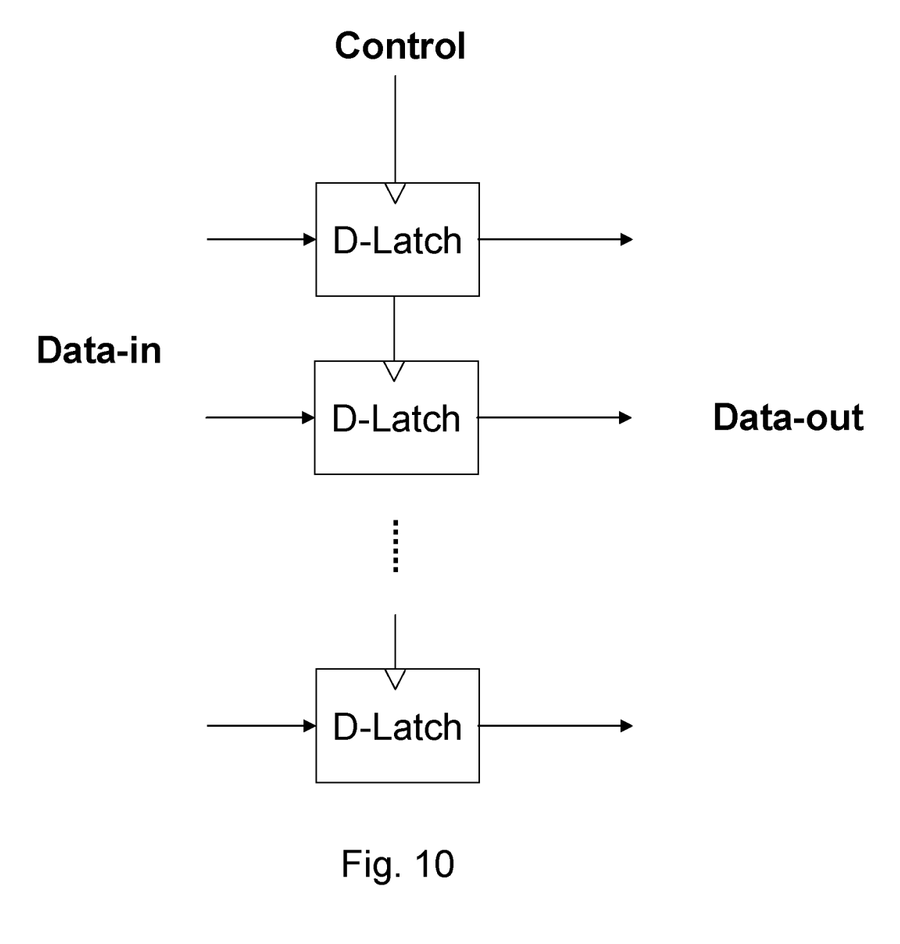
FIG. 10 is a single stage output buffer of the NOC router.

FIG. 10 shows the single stage output buffer of the NOC router 1. Data latches provide the single stage buffer.

Figure 11:
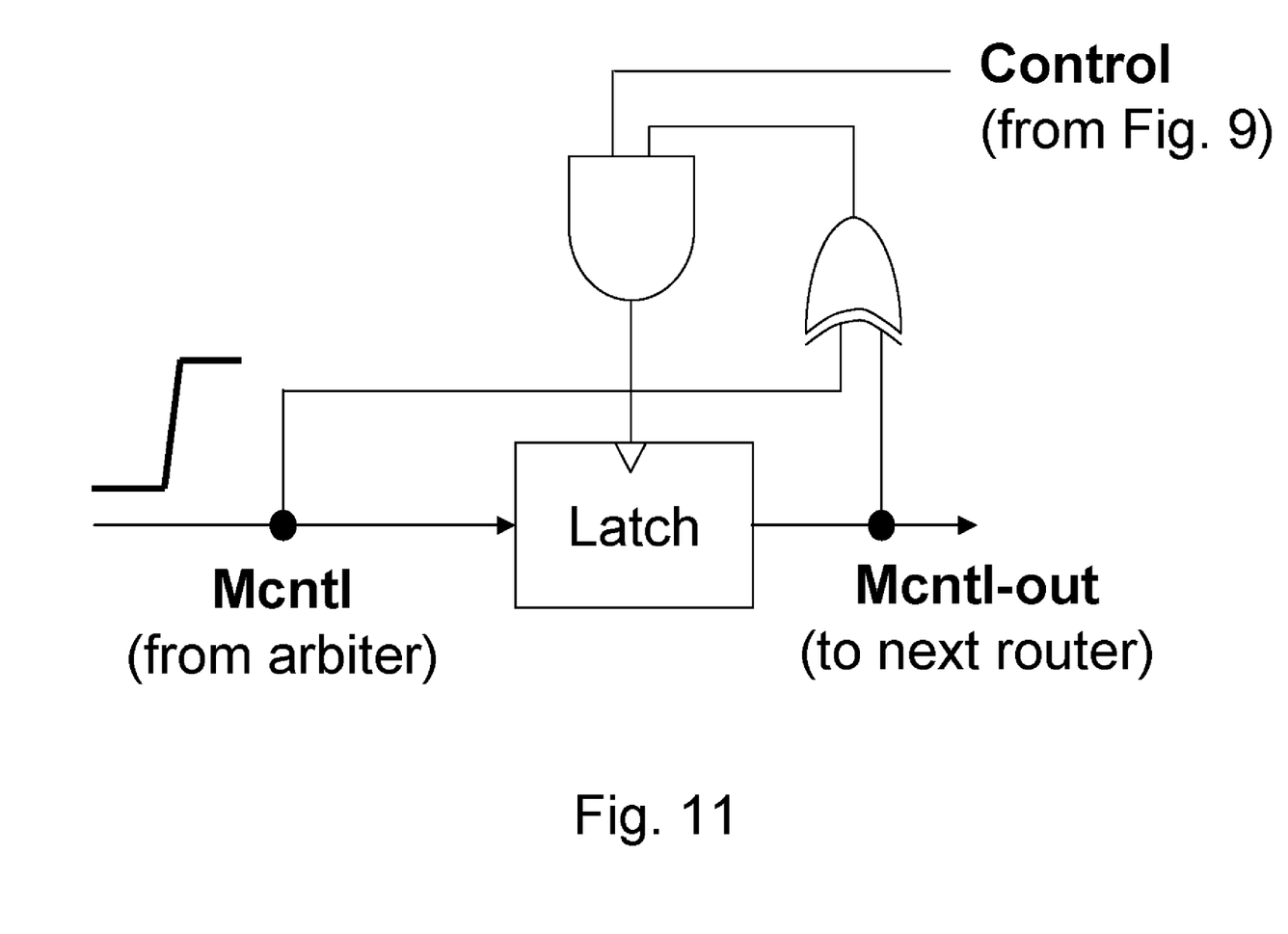
FIG. 11 is a synchronization circuit for the signal Mcnt1 between two adjacent NOC routers.

FIG. 11 shows the synchronization circuit of the control signal 'Mcnt1' between two subsequent router ports. This signal controls the overall data communication asynchronously between a source or an output port of a router and the flowing input port of an adjacent router.

While illustrative embodiments of the invention are set forth and described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A network-on-chip router comprising:
   an input buffer,
   an input controller connected to said input buffer,
   an arbiter connected to said input controller,
   a crossbar connected to said arbiter and said input buffer, and
   an output buffer connected to said crossbar,
   wherein the propagation delay of data through the input buffer is lower than a combined propagation delay of data through the input controller and the arbiter.

2. The network-on-chip router according to claim 1, wherein said input buffer comprises:
   a first data latch and a second data latch, arranged in series so that an output of the first data latch is an input of the second data latch.

3. The Network-on-chip router according to claim 2, wherein said input buffer further comprises:
   a plurality of data latches arranged in a cascaded design.

4. The network-on-chip router according to claim 1, wherein said router is asynchronous.

5. The network-on-chip router according to claim 1, wherein said crossbar uses transmission gates.

6. The network-on-chip router according to claim 1, wherein said crossbar uses pass transistors.

7. The network-on-chip router according to claim 1, wherein said output buffer has a single stage.

8. The network-on-chip router according to claim 7, wherein said single stage output buffer uses a data latch.

9. The Network-on-chip router according to claim 1, wherein the input controller comprises:
   a level comparator,
   a row comparator, and
   a column comparator.

10. The network-on-chip router according to claim 9, where the input controller further comprises:
    a turn evaluator which is connected to the level comparator, row comparator and column comparator.

11. The network-on-chip router according to claim 8, wherein the output buffer further comprises:
    a control circuit for each data latch,
    wherein the control circuit is logic based.

12. The network-on-chip router according to claim 1, wherein:
    said router is an adaptive router.

13. The network-on-chip router of claim 1, wherein said router uses a shortest path routing algorithm.

14. A method of routing data on an integrated circuit using a network-on-chip router, comprising:
    receiving data into a cascaded input buffer,
    propagating the data through the cascaded input buffer and into an input controller and then propagating the data into an arbiter,
    wherein the propagation delay through the cascaded input buffer is less than a combined propagation delay through the input controller and the arbiter, and
    outputting the data from the network-on-chip router to another node.

15. The method of routing data according to claim 14, further comprising:
    propagating the data from the input buffer to a crossbar.

16. The method of routing data according to claim 14, further comprising:
    propagating the data from a crossbar to an output buffer.

17. The method of routing data according to claim 14, wherein the router uses a shortest path adaptive algorithm to route the data to a next node.

18. The method of routing data according to claim 14, wherein the input controller only uses logic based circuits.

19. The method of routing data according to claim 14, wherein the router only uses logic based circuits.

* * * * *